United States Patent
Zhai et al.

(10) Patent No.: US 7,765,236 B2
(45) Date of Patent: Jul. 27, 2010

(54) EXTRACTING DATA CONTENT ITEMS USING TEMPLATE MATCHING

(75) Inventors: Yanhong Zhai, Redmond, WA (US); Yi Li, Issaquah, WA (US); Richard Oian, Sammamish, WA (US); Hong Gao, Seattle, WA (US); Lei Tan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 11/848,987

(22) Filed: Aug. 31, 2007

(65) Prior Publication Data

US 2009/0063500 A1 Mar. 5, 2009

(51) Int. Cl.
*G06F 17/30* (2006.01)
(52) U.S. Cl. .................. 707/797; 707/804; 715/713
(58) Field of Classification Search ......... 707/797–804; 715/713; 706/12
See application file for complete search history.

(56) References Cited

U.S. PATENT DOCUMENTS

| | | | |
|---|---|---|---|
| 6,538,673 | B1 | 3/2003 | Maslov |
| 6,772,165 | B2 | 8/2004 | O'Carroll |
| 6,778,703 | B1 | 8/2004 | Zlotnick |
| 6,810,414 | B1 | 10/2004 | Brittain |
| 7,072,984 | B1 | 7/2006 | Polonsky |
| 7,174,327 | B2 | 2/2007 | Chau |
| 7,176,921 | B2 | 2/2007 | Rising |
| 2004/0049737 | A1* | 3/2004 | Simon Hunt et al. ........ 715/513 |
| 2004/0102958 | A1 | 5/2004 | Anderson |
| 2006/0242563 | A1 | 10/2006 | Liu |
| 2006/0265712 | A1 | 11/2006 | Zhou |
| 2008/0010056 | A1* | 1/2008 | Zhou et al. ..................... 704/8 |
| 2008/0195626 | A1* | 8/2008 | Ukigawa et al. .............. 707/10 |
| 2009/0043777 | A1* | 2/2009 | Wyler et al. ................... 707/10 |
| 2009/0070295 | A1* | 3/2009 | Otomori et al. ................ 707/3 |
| 2009/0198714 | A1* | 8/2009 | Wake ......................... 707/101 |

OTHER PUBLICATIONS

Burget, Radek, "Information Extraction from HTML Documents Based on Logical Document Structure", thesis submitted Aug. 27, 2004, Brno University of Technology, http://www.fit.vutbr.cz/~burgetr/thesis/burget_thesis.ps.

(Continued)

*Primary Examiner*—Don Wong
*Assistant Examiner*—Hanh B Thai
(74) *Attorney, Agent, or Firm*—Shook, Hardy & Bacon, L.L.P.

(57) ABSTRACT

Systems and methods for extracting data content items from a web page are provided. A template is created by labeling data content items of interest associated with a web page and generating a template Document Object Model (DOM) tree based on the labeled web page. DOM trees are also generated for additional web pages that contain data content items for which extraction may be desired. These DOM trees are compared to the template DOM tree to determine alignment therebetween. The aligned data content items may then be extracted from the additional web pages and indexed, as desired. Labeling the data content items of interest prior to generating a template DOM tree allows for the desired data content items to be specified and more accurately extracted from related and/or similarly structured web pages.

20 Claims, 3 Drawing Sheets

OTHER PUBLICATIONS

Day, Min-Yuh et al., "Reference Metadata Extraction Using a Hierarchical Knowledge Representation Framework", Decision Support Systems 43 (2007) pp. 152-167, http://www.iis.sinica.edu.tw/IASL/webpdf/paper-2007-Reference_Metadata_Extraction_Using_a_Hierarchical_Knowledge_Representation_Framework.pdf.

Gopal, Prasad et al., "Citation Senser", http://66.102.9.104/search?q=cache:NmEgDhXJPxcJ:pubs.dlib.vt.edu:9090/30/02/CS6604_-Project_Reort_CitationSenser.pdf+dom+trees+page+%22template+matching%22+information+extraction&hl=en&ct=clnk&cd=3&gl=uk&client=firefox-a.

Le, Daniel X. et al., "Automated Document Labeling for Web-based Online Medical Journals", Lister Hill National Center for Biomedical Communications, National Library of Medicine, Bethesda, Maryland, http://archive.nlm.nih.gov/pubs/le/sci2003/sci2003.doc.

Zhai, Yanhong et al., "Structured Data Extraction from the Web Based on Partial Tree Alignment", IEEE Transactions on Knowledge and Data Engineering, vol. 18, No. 12, Dec. 2006, doi.ieeecomputersociety.org/10.1109/TKDE.2006.197.

Zhai, Yanhong et al., "Web Data Extraction Based on Partial Tree Alignment", WWW2005, May 10-14, 2005, www2005.org/cdrom/docs/p76.pdf.

\* cited by examiner

EXTRACTING DATA CONTENT ITEMS USING TEMPLATE MATCHING

BACKGROUND

Structured data in web pages usually contain important information. Such data are often retrieved from underlying databases and displayed in web pages using fixed templates. Extracting such data enables one to integrate data from multiple web sites and pages to provide value-added services, such as comparative shopping, meta querying and search. However, using a fixed template to blindly extract data from a web page can result in extracted data that is incorrectly labeled and possibly incomplete.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention relate to systems and methods for extracting data content items from web pages. A template is created by labeling data content items of interest associated with a web page and generating a template Document Object Model (DOM) tree based on the labeled web page. DOM trees are also generated for additional web pages that contain data content items for which extraction may be desired. These DOM trees are compared to the template DOM tree to determine alignment there between. The aligned data content items may then be extracted from the additional web pages and indexed, as desired. Labeling the data content items of interest prior to generating a template DOM tree allows for the desired data content items to be specified and more accurately extracted from related and/or similarly structured web pages.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems and methods for extracting data content items from web pages. A template is created by labeling data content items of interest associated with a web page and generating a template Document Object Model (DOM) tree based on the labeled web page. DOM trees are also generated for additional web pages that contain data content items for which extraction may be desired. These DOM trees are compared to the template DOM tree to determine alignment there between. The aligned data content items may then be extracted from the additional web pages and indexed, as desired. Labeling the data content items of interest prior to generating a template DOM tree allows for the desired data content items to be specified and more accurately extracted from related and/or similarly structured web pages.

Having briefly described an overview of embodiments of the present invention, an exemplary operating environment suitable for use in implementing embodiments of the present invention is described below.

Figure 1:
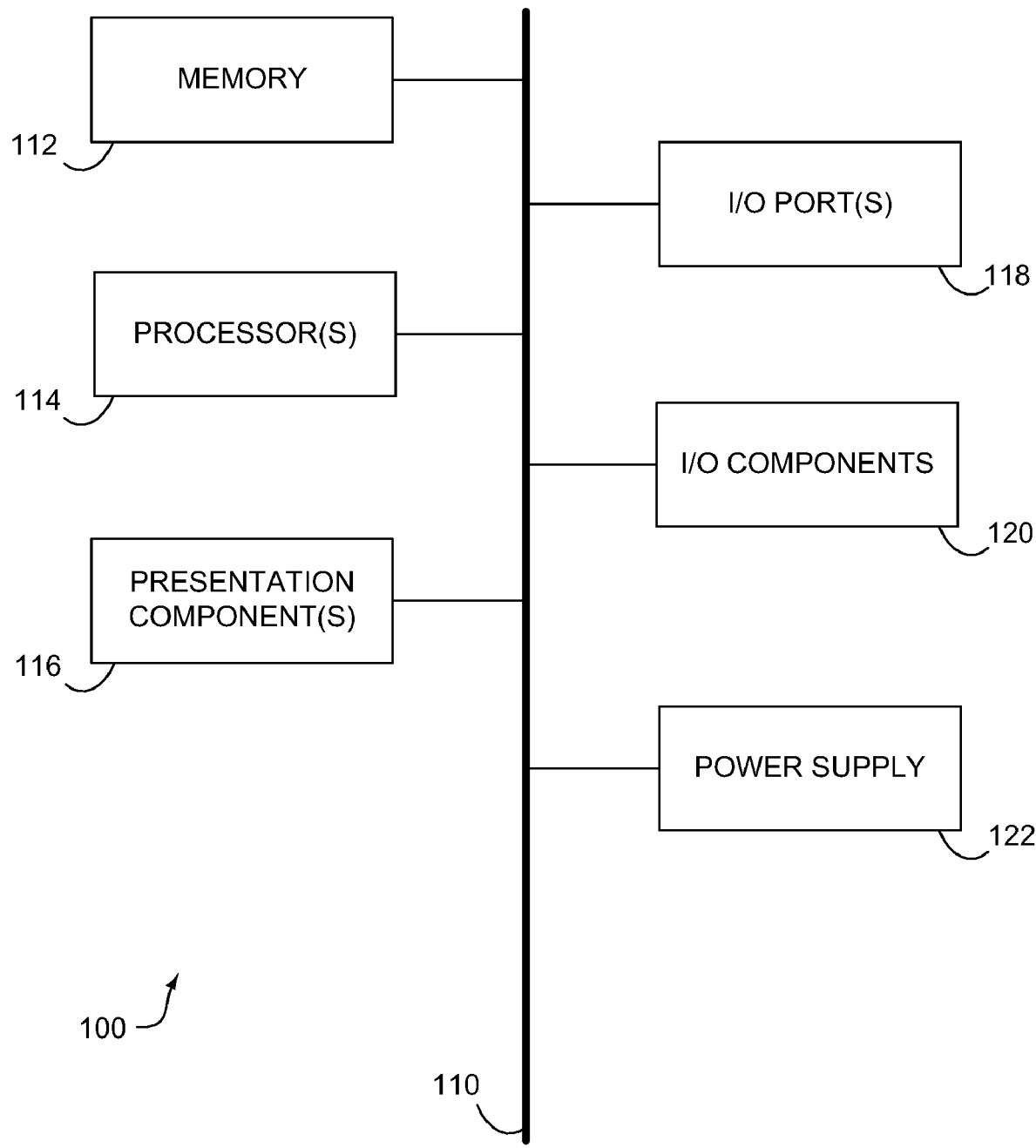
FIG. 1 is a block diagram of an exemplary computing system environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the illustrated computing environment be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty-computing devices, and the like. Embodiments of the present invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disk drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game advertisement, satellite dish, scanner, printer, wireless device, and the like.

Figure 2:
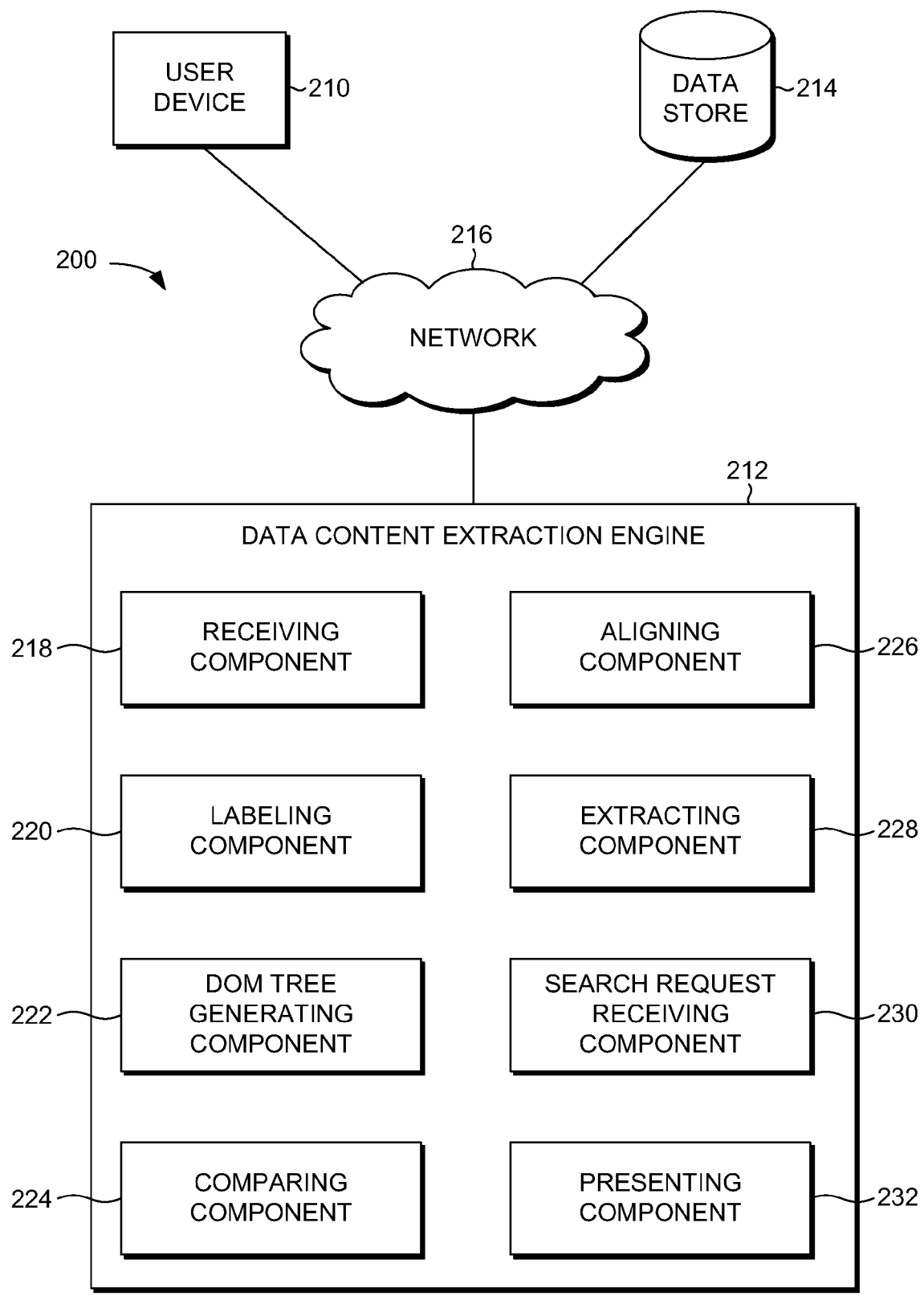
FIG. 2 is a block diagram illustrating an exemplary system for extracting data content items from web pages, in accordance with an embodiment of the invention.

Turning now to FIG. 2, a block diagram is illustrated that shows an exemplary computing system 200 configured to extract data content items from web pages, in accordance with an embodiment of the present invention. It will be understood and appreciated by those of ordinary skill in the art that the computing system 200 shown in FIG. 2 is merely an example of one suitable computing environment and is not intended to suggest any limitation as to the scope of use or functionality of the present invention. Neither should the computing system 200 be interpreted as having any dependency or requirement related to any single component/module or combination of components/modules illustrated therein.

Computing system 200 includes a user device 210, a data content extraction engine 212 and a data store 214, all in communication with one another via a network 216. The network 216 may include, without limitation, one or more local area networks (LANs) and/or wide area networks (WANs). Such networking environments are commonplace in offices, enterprise-wide computer networks, intranets, and the Internet. Accordingly, the network 216 is not further described herein.

The data store 214 may be configured to store information associated with various data content items, as more fully described below. In various embodiments, such information may include one or more text blocks, one or more images, one or more videos, one or more template Document Object Model (DOM) trees, data content item indices, and the like. It will be understood and appreciated by those of ordinary skill in the art that the information stored in the data store 214 may be configurable and may include any information relevant to data content items that may be extracted for indexing. Further, though illustrated as a single, independent component, data store 214 may, in fact, be a plurality of data stores, for instance, a database cluster, portions of which may reside on a computing device associated with the data content extraction engine 212, the user device 210, another external computing device (not shown), and/or any combination thereof.

Each of the data content extraction engine 212 and the user device 210 shown in FIG. 2 may be any type of computing device, such as, for example, computing device 100 described above with reference to FIG. 1. By way of example only and not limitation, the data content extraction engine 212 and/or the user device 210 may be a personal computer, desktop computer, laptop computer, handheld device, mobile handset, consumer electronic device, and the like. It should be noted, however, that the present invention is not limited to implementation on such computing devices, but may be implemented on any of a variety of different types of computing devices within the scope of the embodiments hereof.

As shown in FIG. 2, the data content extraction engine 212 includes a receiving component 218, a labeling component 220, a DOM tree generating component 222, a comparing component 224, an aligning component 226, an extracting component 228, a search request receiving component 230, and a presenting component 232. In some embodiments, one or more of the illustrated components 218, 220, 222, 224, 226, 228, 230 and 232 may be implemented as stand-alone applications. In other embodiments, one or more of the illustrated components 218, 220, 222, 224, 226, 228, 230 and 232 may be integrated directly into the operating system of the data content extraction engine 212 or the user device 210. In the instance of multiple servers, embodiments of the present invention contemplate providing a load balancer to federate incoming queries to the servers. It will be understood by those of ordinary skill in the art that the components 218, 220, 222, 224, 226, 228, 230 and 232 illustrated in FIG. 2 are exemplary in nature and in number and should not be construed as limiting. Any number of components may be employed to achieve the desired functionality within the scope of the embodiments of the present invention.

The receiving component 218 is configured for receiving data content items associated with web pages. Thus, the receiving component 218 is configured for receiving a plurality of web pages, each web page having at least one data content item associated therewith. The received data content items may include a variety of different media types including, but not limited to, text, images, audio content, video content, and any combination thereof. Once received by the receiving component 218, the data content items may be stored, for instance, in association with data store 214, and/or indexed as desired. Indexing is described more fully herein below.

The labeling component 220 is configured for receiving an indication to label at least one data content item associated with a web page (e.g., based upon user input received via a keyboard, stylus, or the like) and for labeling one or more indicated data content items. More specifically, any data content item that one wishes to extract from related or similarly structured web pages may be labeled. Generally, data content items for which indexing is desired to facilitate subsequent use (e.g., searching) are selected or indicated for labeling. For example, data content items associated with a web page that may be indicated for labeling may include the name of a restaurant, the address of the restaurant, and the phone number of the restaurant. Additionally, one or more reviews of the restaurant may be included as labeled data content items associated with the web page. Multimedia data content items desired for labeling may include, by way of example only and not limitation, the title, release date, and description of an image or video, as well as one or more comments associated therewith.

The labeling component 220 is further configured for labeling nodes of DOM trees that are associated with labeled data content items. In embodiments, such nodes may be labeled as repeat nodes to indicate that multiple data content items having similar content and/or structure may be matched therewith, as more fully described below.

The DOM tree generating component 222 is configured for generating DOM trees associated with web pages received by the receiving component 218. DOM is an application programming interface (API) for HTML and XML documents that defines the logical structure of a document, and the way it is accessed. In a web browser, each HTML element (e.g., HTML tags with optional attributes, textual content, and the like) corresponds to a data content item which, in turn, corresponds to a node (or repeat node) in the corresponding DOM tree. Thus, a DOM tree may be generated based on the HTML elements. In accordance with an embodiment of the present invention, once a DOM tree is generated based on the labeled web page, this DOM tree may be used as a template when comparing, aligning, and extracting information from other related and/or similarly structured web pages, as more fully described below. Generating a DOM tree from a web page containing labeled data content items results in a DOM tree having one or more labeled nodes, as more fully described below.

The comparing component 224 is configured for comparing template DOM trees with the DOM trees of additional web pages to determine whether the corresponding web pages are related and/or similarly structured. One skilled in the art will understand and appreciate that various methods may be used to compare a template DOM tree with the DOM trees associated with additional web pages. In one embodiment, such comparison is conducted by determining tree distance measures. Examples of methods to determine such tree distance measures include tree edit distance, alignment distance, isolated-subtree distance, top-down distance, and bottom-up distance. In an embodiment of the invention, an enhanced simple tree matching (ESTM) algorithm is used. In this method, the roots of the DOM trees are first compared to determine whether they contain distinct labels or have visual conflicts. If so, the two trees are determined to not be related or otherwise similarly structured, and the algorithm terminates. Visual conflict may occur when the bounding rectangles of the two roots are so different (e.g., one is twice as large as another or more in either x or y direction) that there is virtually no possibility that they contain similar data content items. This initial step allows for the simplification of later computations.

Next, if the roots contain identical labels and do not have visual conflicts, then the algorithm recursively finds the maximum matching between the same level subtrees of the web pages and saves this data in a matrix. Based on this matrix, a dynamic programming scheme is applied to find the maximum number of pairs between the two trees that match one another. When one of the DOM trees is a template that has been labeled, the determination of matching nodes between the template DOM tree and the DOM tree associated with an additional web page allows for the extraction (and indexing) of the data content item associated with that node, as more fully described below. Various methods of comparison are known and appreciated by those of ordinary skill in the art and, accordingly, are not further described herein.

Further, the comparing component 224 allows for dissymmetric matching. That is, the template DOM tree can have nodes that are labeled as repeat nodes so that they may be matched to multiple nodes in the DOM tree of a related or similarly structured web page. Such is desired, for instance, when a web page contains a plurality of data content items having similar structure and content (e.g., restaurant reviews, video commentaries, and the like). If the labeling component 220 has labeled a node as a repeat node in the template DOM tree, the comparing component 224 will be able to match each of the data content items associated with the web page that align with the repeat node, as more fully described below.

The aligning component 226 is configured for aligning matching nodes of the DOM trees, in particular, for aligning matching nodes of a template DOM tree and the DOM tree associated with another web page. One skilled in the art will understand and appreciate that various methods of data alignment may be used. In an embodiment of the invention, a partial tree alignment method is used, which aligns DOM trees by progressively growing a seed tree. The seed tree is initially the tree with the maximum number of data fields and, in most instances, the seed tree will be the DOM tree associated with the template web page. Then, for each web page determined to be related or similarly structured, an aligning algorithm attempts to locate a matching node in the related web page DOM tree for each node in the template DOM tree. When a match is found for a specific node, a link is created between the node of the related web page DOM tree and the corresponding node in the template DOM tree. If no match can be found for a specific node, then the algorithm attempts to expand the seed tree by inserting the unmatched node into the seed tree. The expanded seed tree is then used in subsequent matching. In this way, the maximum number of data content items may be extracted and indexed, as more fully described below.

The data extraction component 228 is configured for extracting data content items that align with one or nodes of a template DOM tree (generally a labeled node) from a related or similarly structured web page. After the data content items associated with a related or similarly structured web page have been matched utilizing the comparing component 224 and the matching data content items have been aligned utilizing the aligning component 226, the aligned data content items can be extracted from the web pages. By way of example, if the search is a search of local directory data, the local data that has been labeled, such as a business's name, address, and phone number may be extracted from related or similarly structured web pages and indexed for subsequent use, e.g., meta querying and search.

The search request receiving component 230 is configured for receiving a search request for which satisfying content is desired. By way of example, the search request may be received at a user interface as the result of user input. It will be understood and appreciated by those of ordinary skill in the art that multiple methods exist by which a user may input a search request. For instance, search requests may be input, by way of example only, utilizing a keyboard, joystick, trackball, touch-advertisement, or the like. Alternative user interfaces known in the software industry are contemplated by the invention. The search request is typically a user-initiated action or response that is received at a user interface, as discussed above. Examples of a request are a click, click-through, or selection by a user, e.g., human user or robotic user; however, it is understood and appreciated by one of ordinary skill in the art that a request may take any number of forms of indication at a web page. Further, it is contemplated by the present invention that a robotic user may be any non-human operator (i.e., an internet bot, web bot program, virus, robot, web crawler, web spidering program, or any software applications that run automated tasks over the Internet), which is an artificial agent that, by its actions, conveys a sense that it has intent or agency of its own. Even further, a human user is contemplated as being a human, but also, an entity (virtual or physical) acting under the present intent of a human operator. Upon receiving a search request, indexed, extracted data content items may be queried to determine if satisfying content is present.

The presenting component 232 is configured for presenting at least one of search results and information relating to data extraction to a user. Typically such presentation will be by way of display in associations with a user interface. However, other forms of presentation, including audio presentation and audio/video presentation, are contemplated to be within the scope of embodiments hereof.

Figure 3:
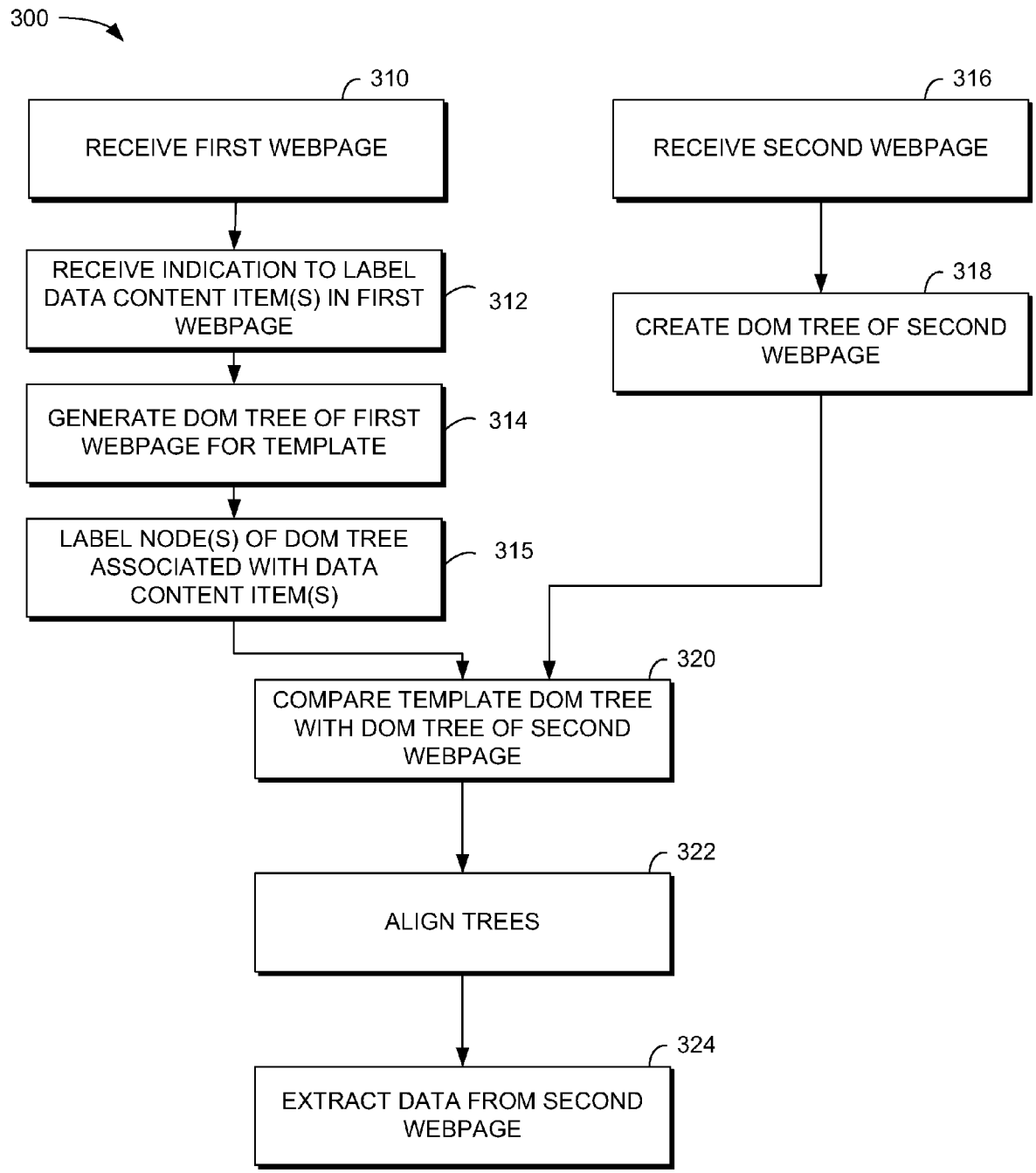
FIG. 3 is a flow diagram illustrating an exemplary method for extracting data content items from web pages, in accordance with an embodiment of the invention.

Turning now to FIG. 3, an exemplary method for extracting data content items of interest from a web page is illustrated and labeled generally as reference numeral 300. Initially, as indicated in block 310, a first web page having one or more data content items associated therewith (e.g., textual content, image content, video content, and the like) is received, for instance, utilizing receiving component 218 of FIG. 2. Subsequently, an indication is received to label one or more specific data content items that may be of interest in association with the web page (for instance, utilizing labeling component 220 of FIG. 2). This is indicated at block 312.

Subsequently, a DOM tree is generated that is representative of the content associated with the web page, as indicated in block 314 (for instance, utilizing DOM tree generating component 222 of FIG. 2). The generated DOM tree contains nodes that are organized in a hierarchical fashion, where each node represents a data content item associated with the web page.

Next, as indicated at block 315, the nodes of the DOM tree associated with the nodes for which an indication was received are labeled, e.g., utilizing labeling component 220 of FIG. 2. For instance, in a search of local directory content, nodes associated with indicated data content items may be labeled such that information of a business, such as its name, telephone number, and address may be readily extracted and indexed, as desired. For a multimedia search, labeled nodes may be associated with a data content item that includes an image or video title, description of the image or video, and release date. The DOM tree associated with the web page includes labeled nodes at the location of labeled data content items (that is, data content items for which an indication that labeling is desired has been received) and serves as a template when extracting data from other web pages, as more fully described below.

When creating DOM templates for data extraction, list pages, detail pages, or a combination thereof can be used. A list page is a page containing multiple data records. An example of a list page is a web page that lists multiple products with a link to access each product. A detail page is a page containing additional details about the corresponding data record on a list page. So, for example, when the data record of one of the products from the list page above is clicked, a detail page with more information about that specific product results.

As indicated at block 316, before, after, or concurrently, a second web page is received (e.g., utilizing the receiving component 218 of FIG. 2). A second web page may include any web page that contains data content items that may be extracted. Additionally, the second web page can be a web page related to, or similarly structured with respect to, the first web page. It will be understood and appreciated by one skilled in the art that block 316 may occur when a crawler searches web pages and the web pages are indexed. The data content items associated with the second web page are then organized into a DOM tree structure, for instance, utilizing the DOM tree generating component 222 of FIG. 2. This is indicated at block 318.

Once a DOM tree template and a DOM tree of a second web page have been created, a tree matching algorithm is used (e.g., by the comparing component 224 of FIG. 2) to compare the DOM trees. This is indicated at block 320. After tree matching has been performed, the trees are then aligned, e.g., utilizing the aligning component 228 of FIG. 2, as indicated in block 322. Subsequently, data content items from the second web page that are aligned with labeled nodes of the template DOM tree may be extracted (e.g., utilizing extracting component 228 of FIG. 2) and the extracted data content items may be indexed for subsequent use, as desired. This is indicated at block 324.

As can be seen, embodiments of the present invention relate to one or more computer storage media having computer-executable instructions embodied thereon for performing a method for extracting data content items from web pages. The method includes receiving a first web page having one or more data content items associated therewith; receiving an indication to label at least one of the data content items associated with the first web page; generating a Document Object Model (DOM) tree associated with the first web page, the DOM tree having a node associated with each data content item; labeling the node of the DOM tree associated with the at least one indicated data content item to generate a template DOM tree; comparing the template DOM tree with a DOM tree associated with a second web page to determine alignment there between; and if it is determined that a node of the DOM tree associated with the second web page aligns with the labeled node associated with the template DOM tree, extracting a data content item from the second web page that is associated with the aligned node of the DOM tree.

In an additional embodiment, the present invention relates to a computer system embodied on at least one computer storage media having computer-executable instructions embodied thereon for performing a method for extracting data content items from web pages. The system includes a receiving component configured for receiving a plurality of web pages, each web page having at least one data content item associated therewith; a Document Object Model (DOM) tree generating component configured for generating a DOM tree associated with one or more of the received web pages; a labeling component configured for labeling at least one node associated with a generated DOM tree in accordance with a received labeling indication; a comparing component configured for comparing a first DOM tree having at least one labeled node associated therewith with a second DOM tree; and an extracting component configured for extracting at least one data content item associated with the second DOM tree in accordance with the at least one labeled note associated with the first DOM tree.

Still further, in an additional embodiment, the present invention relates to a method in a computing environment for extracting data content items from a web page, at least two of the data content items having a repeated pattern. The method includes receiving a first web page having a plurality of data content items associated therewith; receiving an indication to label at least two of the plurality of data content items, wherein the at least two of the plurality of data content items have a repeated pattern; generating a Document Object Model (DOM) tree associated with the first web page, the DOM tree having a node associated with each of the plurality of data content items; labeling the nodes of the DOM tree to create a template DOM tree, wherein a node associated with one of the at least two data content items having a repeated pattern is labeled as a repeat node; comparing the template DOM tree with a DOM tree associated with a second web page to determine alignment there between; and if it is determined that a node of the DOM tree associated with the second web page aligns with the labeled node associated with the template DOM tree, extracting one or more data content items from the second web page that are associated with the aligned repeat node of the DOM tree.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. One or more computer storage media having computer-executable instructions embodied thereon for performing a method for extracting data content items from web pages, the method comprising:
   receiving a first web page having one or more data content items associated therewith;
   receiving an indication to label at least one of the data content items associated with the first web page;
   generating, utilizing a computing device, a Document Object Model (DOM) tree associated with the first web page, the DOM tree having a node associated with each data content item;
   labeling, utilizing the computing device, the node of the DOM tree associated with the at least one indicated data content item to generate a template DOM tree;
   comparing, utilizing the computing device, the template DOM tree with a DOM tree associated with a second web page to determine alignment there between; and
   if it is determined that a node of the DOM tree associated with the second web page aligns with the labeled node associated with the template DOM tree, extracting, utilizing the computing device, a data content item from the second web page that is associated with the aligned node of the DOM tree.

2. The computer storage media of claim 1, wherein the one or more data content items associated with the first web page comprise items associated with an individual or organization data listing.

3. The computer storage media of claim 1, wherein one or more data content items associated with the first web page comprise one or audio content items, video content items, images, text, or any combination thereof.

4. The computer storage media of claim 1, wherein at least two of the data content items associated with the template DOM tree have a repeated pattern.

5. The computer storage media of claim 4, wherein labeling the node of the DOM tree associated with the at least one indicated data content item to create a template DOM tree further comprises labeling a node of the template DOM tree associated with one of the at least two data content items having a repeated pattern with a repeat label.

6. The computer storage media of claim 1, wherein comparing the template DOM tree with a DOM tree associated with a second web page to determine alignment there between comprises measuring the top-down distance between one node of the template DOM tree and a corresponding node of the DOM tree associated with a second web page.

7. The computer storage media of claim 1, wherein comparing the template DOM tree with a DOM tree associated with a second web page to determine alignment there between comprises employing partial tree alignment to insert one or more nodes into the template DOM tree.

8. The computer storage media of claim 1, wherein the method further comprises indexing the extracted data content item.

9. A computer system including at least one computer storage media having computer-executable components embodied thereon for performing a method for extracting data content items from web pages, the computer-executable components comprising:
   a receiving component configured for receiving, utilizing a computing device, a plurality of web pages, each web page having at least one data content item associated therewith;
   a Document Object Model (DOM) tree generating component configured for generating, utilizing the computing device, a DOM tree associated with one or more of the received web pages;
   a labeling component configured for labeling, utilizing the computing device, at least one node associated with a generated DOM tree in accordance with a received labeling indication;
   a comparing component configured for comparing, utilizing the computing device, a first DOM tree having at least one labeled node associated therewith a second DOM tree; and
   an extracting component configured for extracting, utilizing the computing device, at least one data content item associated with the second DOM tree in accordance with the at least one labeled note associated with the first DOM tree.

10. The computer system of claim 9, wherein the at least one data content item comprises at least one item associated with an individual or organization listing, an audio content item, a video content item, an image, text, or any combination thereof.

11. The computer system of claim 9, further comprising a search request receiving component configured for receiving a search request for at least one satisfying data content item.

12. The computer system of claim 11, further comprising a presenting component configured for presenting the at least one satisfying data content item.

13. The computer system of claim 9, further comprising an aligning component configured for aligning the matching nodes of the first DOM tree and the second DOM tree.

14. The computer system of claim 9, wherein the comparing component is further configured for measuring the top-down distance between the first DOM tree and the second DOM tree.

15. The computer system of claim 9, wherein the comparing component is further configured to utilize partial tree alignment algorithm to insert at least one node into the first DOM tree.

16. A method in a computing environment for extracting data content items from a web page, at least two of the data content items having a repeated pattern, the method comprising:
   receiving a first web page having a plurality of data content items associated therewith;

receiving an indication to label at least two of the plurality of data content items, wherein the at least two of the plurality of data content items have a repeated pattern;

generating, utilizing a computing device, a Document Object Model (DOM) tree associated with the first web page, the DOM tree having a node associated with each of the plurality of data content items;

labeling, utilizing the computing device, the nodes of the DOM tree to create a template DOM tree, wherein a node associated with one of the at least two data content items having a repeated pattern is labeled as a repeat node;

comparing, utilizing the computing device, the template DOM tree with a DOM tree associated with a second web page to determine alignment there between; and if it is determined that a node of the DOM tree associated with the second web page aligns with the labeled node associated with the template DOM tree, extracting, utilizing the computing device, one or more data content items from the second web page that are associated with the aligned repeat node of the DOM tree.

17. The method of claim 16, wherein the plurality of data content items associated with the first web page comprise items associated with an individual or organization listing.

18. The method of claim 16, wherein the plurality of data content items associated with the first web page comprise one or audio content items, video content items, images, text, or any combination thereof.

19. The method of claim 16, wherein comparing the template DOM tree with a DOM tree associated with a second web page comprises measuring the top-down distance between one node of the template DOM tree and a corresponding node of the DOM tree associated with a second web page.

20. The method of claim 16, wherein comparing the template DOM tree with a DOM tree associated with a second web page comprises using partial tree alignment to insert one or more nodes into the template DOM tree.

* * * * *